United States Patent Office 3,446,022
Patented May 27, 1969

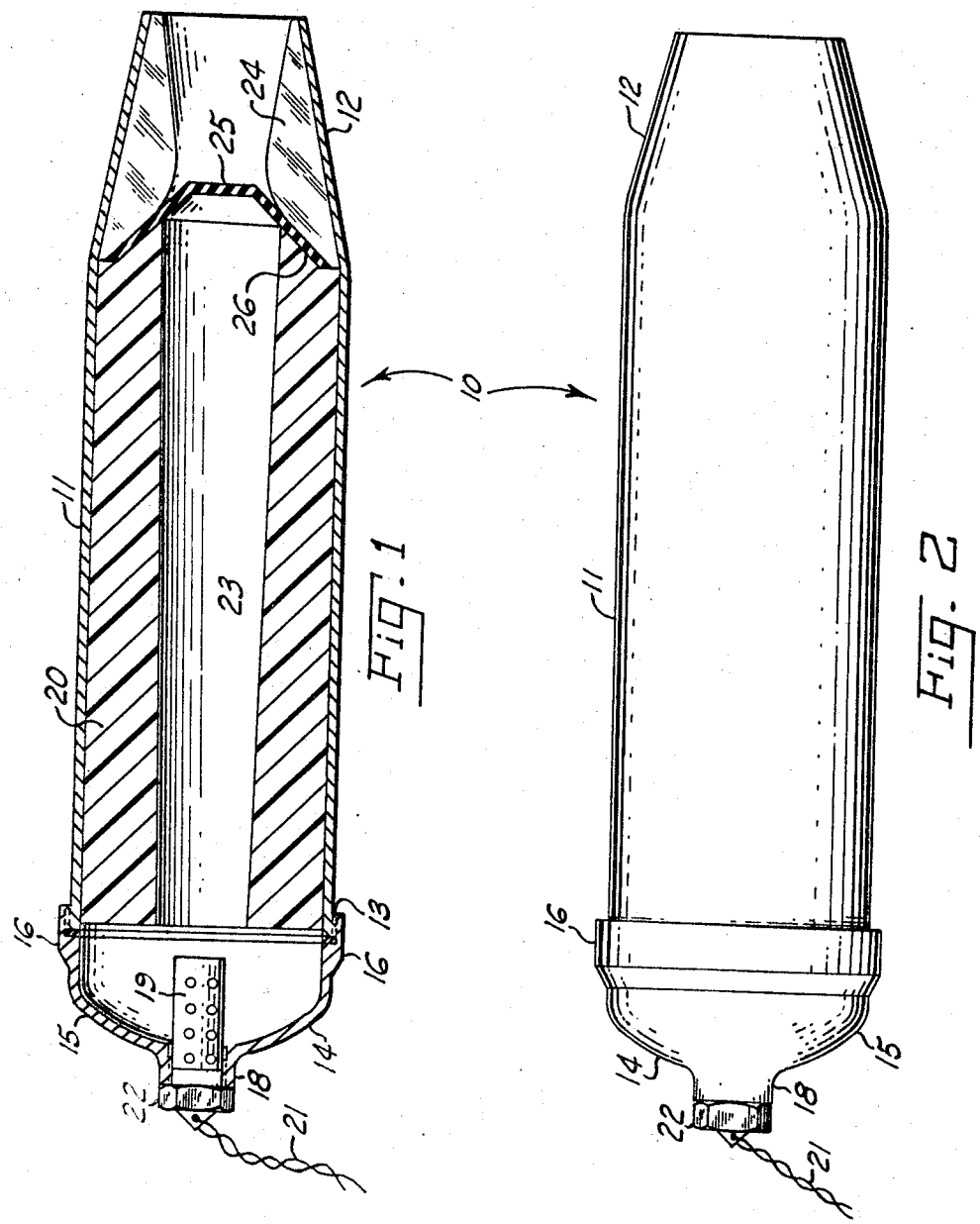

3,446,022
INTEGRAL MOTOR CASE AND NOZZLE FOR SOLID PROPELLANT ROCKET MOTORS
Martin T. Olliff, Jr., Charles F. Williams, Travis J. Hagler, and Oscar M. Hawkins, Huntsville, and William R. Puckett, Trinity, Ala., assignors to Thiokol Chemical Corporation, Bristol, Pa., a corporation of Delaware
Filed Feb. 6, 1967, Ser. No. 614,235
Int. Cl. F02k 9/04
U.S. Cl. 60—256                                      1 Claim

ABSTRACT OF THE DISCLOSURE

A solid propellant rocket motor having an integral rocket motor case and nozzle, and including a self-aligning, self-centering nozzle insert positioned in the nozzle at the aft end of the rocket motor case.

BACKGROUND OF THE INVENTION

Field of the invention

It was determined that to meet certain operational requirements an economical, rapidly assembled solid propellant rocket motor had to be developed. The solid propellant rocket motor covered by the instant invention was, therefore, developed to meet a military requirement for a low cost air to surface missile that could be rapidly processed to meet increased military demands.

DESCRIPTION OF THE PRIOR ART

Prior to the development of the solid propellant rocket motor embodying the invention, missiles meeting the required category included rocket motor cases that were produced separately from the nozzle and the nozzle was produced and then by conventional means was secured to the rocket motor case after the solid propellant had been cast into the rocket motor case. The rocket motor case had an open aft end through which the solid propellant was cast into the rocket motor case and then the nozzle was secured to the open aft end of the rocket motor case. The joint between the nozzle and the rocket motor case was critical and several operations had to be accomplished to insure a leak proof joint. This action produced a very expensive missile and due to the requirements for such missiles, the cost to the military for such missiles was excessive.

To meet the new military requirement the solid propellant rocket motor embodying the invention was developed wherein the rocket motor case was formed integral with the nozzle at the aft end and the head end of the rocket motor case was open through which the solid propellant was cast into the rocket motor case and a head end closure was then threadably connected to the rocket motor case at the head end thereof to conform to the usual closed head end of a solid propellant rocket motor. Placing a sealing gasket between the head end and the rocket motor case provided a leak proof joint without the many operations that are required to connect a nozzle to the rocket motor case.

Thus the solid propellant rocket motor embodying the instant invention required less time to form and assemble than did similar solid propellant rocket motors known to the prior art.

SUMMARY

This invention relates to improvements in solid propellant rocket motors and more particularly to a solid propellant rocket motor having an integral rocket motor case and nozzle and a self-aligning, self-centering nozzle insert in the nozzle.

The solid propellant rocket motor embodying the invention can be produced inexpensively and rapidly and involves a great saving in production of the solid propellant rocket motors that must meet certain operational requirements.

It is an object of the invention, therefore, to produce an integral rocket motor case and nozzle for a solid propellant rocket motor that is less expensive than solid propellant rocket motors of this type that have been previously produced and is capable of rapid assembly to meet certain military requirements.

It is another object of the invention to provide a self-centering, self-aligning nozzle insert for the nozzle that, during the operation of the solid propellant rocket motors, will, by the pressure created in the rocket motor case, be more firmly positioned in the nozzle to provide a more efficient seal between the rocket motor case, the nozzle and the nozzle insert.

With the above and other objects and advantages in view, the invention consists of the novel details of construction, arangement and combination of parts more fully hereinafter described, claimed and illustrated in the accompanying drawing, in which:

BRIEF DESCRIPTION OF THE DRAWING

FIGURE 1 is a longitudinal sectional view of a solid propellant rocket motor embodying the invention; and FIGURE 2 is an elevational view of the solid propellant rocket motor of FIGURE 1.

DESCRIPTION OF THE PREFERRED EMBODIMENT

Referring more in detail to the drawing, wherein like parts are designated by like reference numerals, the reference numeral 10 is used to generally designate a solid propellant rocket motor embodying the invention.

The solid propellant rocket motor 10 comprises a rocket motor case 11 which is formed from a length of tubing that may be of standard gauge or specially formed to meet certain operational requirements. The rocket motor case 11 may be formed by extrusion or by other standard industrial procedures.

After the rocket motor case 11 has been formed, the aft end is formed into a cone-shaped nozzle 12 which can be accomplished by forging, upsetting, spinning or by other techniques that are conventional to the industry.

The head end of the rocket motor case 11 then has an annular externally threaded flange 13 formed thereon to which may be secured a head end 14 for the solid propellant rocket motor 10.

The head end 14 is dome-shaped as at 15 and the open end thereof that is secured to the rocket motor case 11 is provided with an internally threaded band 16, the outer circumference of which is larger in diameter than the rocket motor case 11, the flange 13 on the rocket motor case 11 and the dome-shaped portion 15 of the head end 14. When the band 16 on the head end 14 is threadably connected to the flange 13 on the rocket motor case 11, a circular gasket 17 is used to provide a leak proof seal between the head end 14 and the rocket motor case 11.

To complete the head end 14, an internally threaded neck portion 18 is formed integrally therewith, centrally of the dome-shaped portion 15 and extends outwardly thereof to receive an ignitor 19 for a solid propellant 20 that is cast into the rocket motor case 11 through the open head end thereof. Electrical wires 21 extend from the ignitor 19 to an initiating device, not shown, and a lock nut 22 rigidly retains the ignitor 19 in the neck portion 18 of the head end 14 of the solid propellant rocket motor 10.

The rocket motor case 11 provides a combustion chamber 23 therein in which the solid propellant 20 is cast and the head end of the solid propellant 20 terminates slightly within the rim of the open end of the head end of the rocket motor case 11.

Prior to the installation of the head end 14 on the rocket motor case 11 or before the solid propellant 20 is cast therein, a nozzle insert 24 is inserted into the cone-shaped nozzle 12 and the outer surface of the insert 24 conforms identically with the inner surface of the cone-shaped nozzle 12. The insert 24 may be molded from a suitable plastic or may be formed from other suitable materials by any well-known industrial techniques. The insert 24 is bonded into the cone-shaped nozzle 12 by the use of an elastomeric adhesive and because of the cone-shaped taper of the nozzle 12 the adhesive bond line is self-filling when the insert 24 is installed, thus preventing void areas in the adhesive between the inner surface of the nozzle 12 and the outer surface of the insert 24.

After the insert 24 has been installed in position, a substantially concavo-convex diaphragm 25 is positioned in the rocket motor case 11 in contact with the head end of the insert 24 and when the solid propellant 20 is then cast into the rocket motor case 11, the diaphragm 25 is firmly retained in the position shown in FIGURE 1 between the insert 24 and solid propellant 20. It will be noted also that the aft end of the solid propellant 20 is contoured as at 26 to conform to the shape of the diaphragm 25. The diaphragm 25 is provided to keep moisture and debris from entering the solid propellant rocket motor 10 through the nozzle 12 and thus damaging or contaminating the solid propellant 20.

The solid propellant 20 is ignited by actuation of the ignitor 19 and the combustion of the solid propellant 20 will destroy the diaphragm 25 so that the external gases created by the combustion of the solid propellant 20 will exit through the insert 24 in the nozzle 12.

As the pressure within the combustion chamber 23 of the rocket motor case 11 increases, it will force the insert 24 more firmly into the nozzle 12 and this results in a more efficient seal between the nozzle 12, insert 24 and motor case 11. Such action will also force the insert 24 to be properly aligned and properly centered with the combustion chamber 23 of the rocket motor case 11, thus the insert 24 is self-aligned and self-centering by means of the force exerted thereon by the pressure created in the combustion chamber 23 in the rocket motor case 11.

There has thus been provided a rocket motor case for a solid propellant rocket motor having an integral nozzle on the aft end thereof, a removable head end and a self-aligning, self-centering nozzle insert and it is believed that the construction and operation thereof will be clear to those skilled in the art, it also being understood that variations in the structure and mode of operation thereof can be adhered to provided such variations fall within the spirit of the invention and the scope of the appended claim.

Having thus described the invention what is claimed as new and desired to be secured by Letters Patent is:

1. A rocket motor case for a solid propellant rocket motor having a combustion chamber therein, a solid propellant cast into said combustion chamber, a cone-shaped integral nozzle at the aft end thereof, and an externally threaded annular flange at the head end thereof, a removable dome-shaped head end closure having an internally threaded band that is adapted to be threadably connected to the externally threaded annular flange on the head end of said motor case, a circular sealing gasket positioned between said head end closure and the head end of said rocket motor case, said head end closure having an internally threaded neck portion formed integrally therewith at the center thereof, an externally threaded ignitor threadably connected to the internally threaded neck portion, a retaining means positioned on said ignitor to retain said ignitor in said neck porton, a cone-shaped self-aligning, self-centering insert in said nozzle. and a diaphragm positioned at the aft end of said rocket motor case intermediate of the aft end of said solid propellant and the head end of said insert.

References Cited

UNITED STATES PATENTS

| | | | |
|---|---|---|---|
| 2,447,200 | 8/1948 | Miller | 60—256 |
| 2,455,015 | 11/1948 | Mace et al. | 60—256 |
| 2,986,001 | 5/1961 | Green | 60—255 |
| 3,104,523 | 9/1963 | O'Donnell | 60—256 XR |
| 3,210,932 | 10/1965 | Walker et al. | 60—256 |
| 3,270,502 | 9/1966 | Silver | 60—255 |
| 3,296,802 | 1/1967 | Williams | 60—256 |

CARLTON R. CROYLE, *Primary Examiner.*

U.S. Cl. X.R.

60—271